United States Patent [19]

Balan et al.

[11] 4,385,270
[45] May 24, 1983

[54] TEMPERATURE LIMITED VOLTAGE REGULATOR CIRCUIT

[75] Inventors: Isadore Balan, Elk Grove; Kirk A. Sievers, Roselle, both of Ill.

[73] Assignee: Motorola Inc., Schaumburg, Ill.

[21] Appl. No.: 377,507

[22] Filed: May 12, 1982

[51] Int. Cl.³ .......................... H02J 7/14; H02P 9/30
[52] U.S. Cl. ...................................... 322/23; 320/35; 320/64; 322/28; 322/33
[58] Field of Search ...................... 322/22, 23, 28, 33, 322/34; 320/35, 36, 64, 68

[56] References Cited

U.S. PATENT DOCUMENTS

| | | |
|---|---|---|
| 2,289,582 | 7/1942 | Loesch . |
| 2,427,729 | 9/1947 | Jenkins .................................. 320/22 |
| 3,152,298 | 10/1964 | Byles .................................... 322/73 |
| 3,496,447 | 2/1970 | Thompson ........................ 322/33 X |
| 3,599,079 | 8/1971 | Ansbro et al. ..................... 322/33 X |
| 4,275,344 | 6/1981 | Mori et al. ............................ 322/28 |
| 4,286,205 | 8/1981 | Watrous ............................ 322/28 X |

FOREIGN PATENT DOCUMENTS 1392096  4/1975  United Kingdom ............. 320/64 X

*Primary Examiner*—R. J. Hickey
*Attorney, Agent, or Firm*—James W. Gillman; James S. Pristelski; Margaret Marsh Parker

[57] ABSTRACT

Field coil current of an alternator is controlled in response to temperature as well as to battery voltage, thus allowing maximum safe output power at any ambient temperature. A monostable circuit is utilized for reducing the maximum duty cycle of the field excitation driver in response to a sensed temperature without increasing power dissipation in the regulator.

6 Claims, 3 Drawing Figures

4,385,270

TEMPERATURE LIMITED VOLTAGE REGULATOR CIRCUIT

CROSS REFERENCE

The present invention is related to an invention disclosed and claimed in a co-pending application Ser. No. 137,334, filed Apr. 4, 1980, and assigned to the Assignee of the present invention.

BACKGROUND OF THE INVENTION

This invention relates to the field of voltage regulators and, more particularly, to the capability of varying the maximum output power allowed from an alternator in response to temperature changes.

Many voltage regulator/alternator systems have the output power controlled by a temperature device of some sort, mechanical or electrical, so that as the temperature of the alternator rises to some predetermined value, the output is reduced or cut-off to control the temperature. In general, such reduction or cut-off schemes function by shunting the field coil or adding resistance to the field coil circuit and causing considerable power dissipation with attendant ambient temperature increase. One system utilizes three solenoid-operated switching devices, two of which include temperature sensitive elements for providing a low resistance field coil circuit at low ambient temperatures but switching in more resistance when the temperature rises. No electronic voltage regulator is used with this prior art control circuit but power is wasted in the dropping resistors which, again, raises the ambient temperature near the alternator and further reduces the power-handling capability of the alternator.

SUMMARY OF THE INVENTION

It is, therefore, an object of the present invention to provide an alternator circuit having the maximum output current determined by temperature.

It is a particular object to provide such temperature control with a minimum of increase in power dissipation.

These objects and others which will become apparent are obtained in the circuit of the invention by using a thermal device such as a thermistor to vary the duty cycle of the voltage regulator output circuit. The thermal device may include a thermistor coupled to cause a monostable circuit output to be comprised of essentially zero width pulses at lower temperatures but to have pulses of finite width as the temperature increases. The output pulses of the monostable circuit control a clamping circuit which reduces the duty cycle of the circuit driving the field coil, reducing excitation current at higher temperatures with very little power dissipation.

DETAILED DESCRIPTION OF A PREFERRED EMBODIMENT

Figure 1:
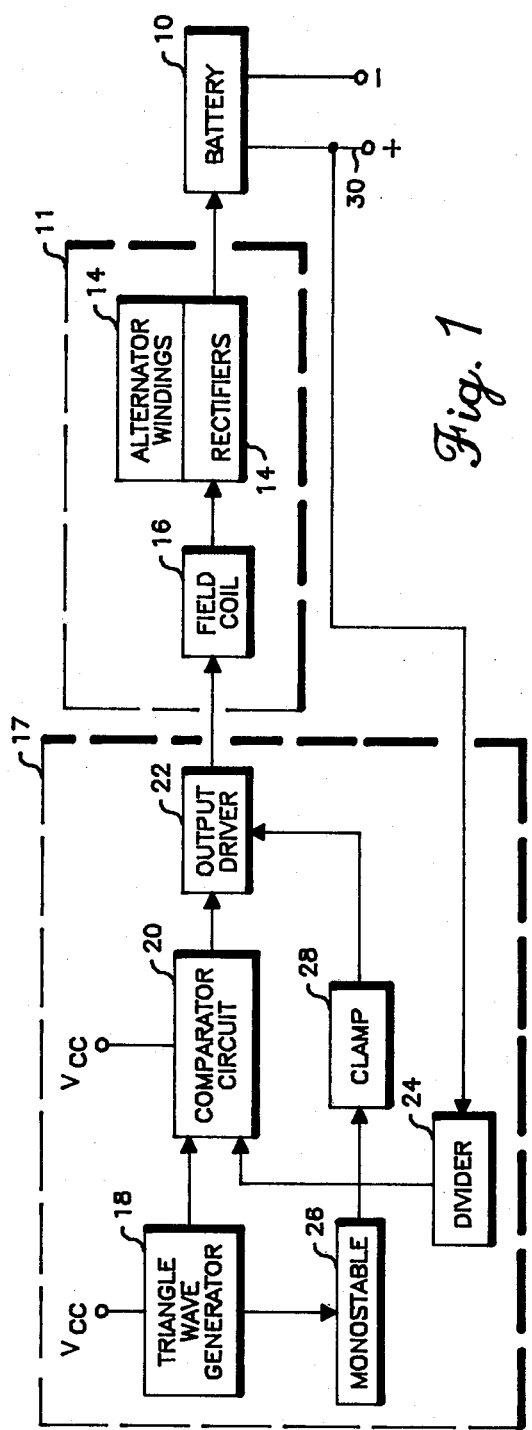
FIG. 1 is a block diagram of a system including an embodiment of the invention.

The block diagram of FIG. 1 shows, in general terms, an alternator/battery charging system as for use in an automobile. A battery 10 is charged by an alternator circuit 11 including alternator windings 12, rectifiers 14 and a field coil 16, as is known. The field coil excitation is derived from a voltage regulator circuit 17 including a triangle wave generator 18, a comparator 20, an output driver 22 and a divider 24. These elements function in a manner similar to that known in the art, particularly as described in the above-referenced co-pending application, and will be explained below. Also forming a part of the voltage regulator circuit 17 in the present invention are a monostable circuit 26 and clamping circuit 28, the latter elements also controlling the output driver 22. Elements such as ignition switch, lamp, etc., are not shown but may be presumed to be present and to function as in the known art.

Figure 2:
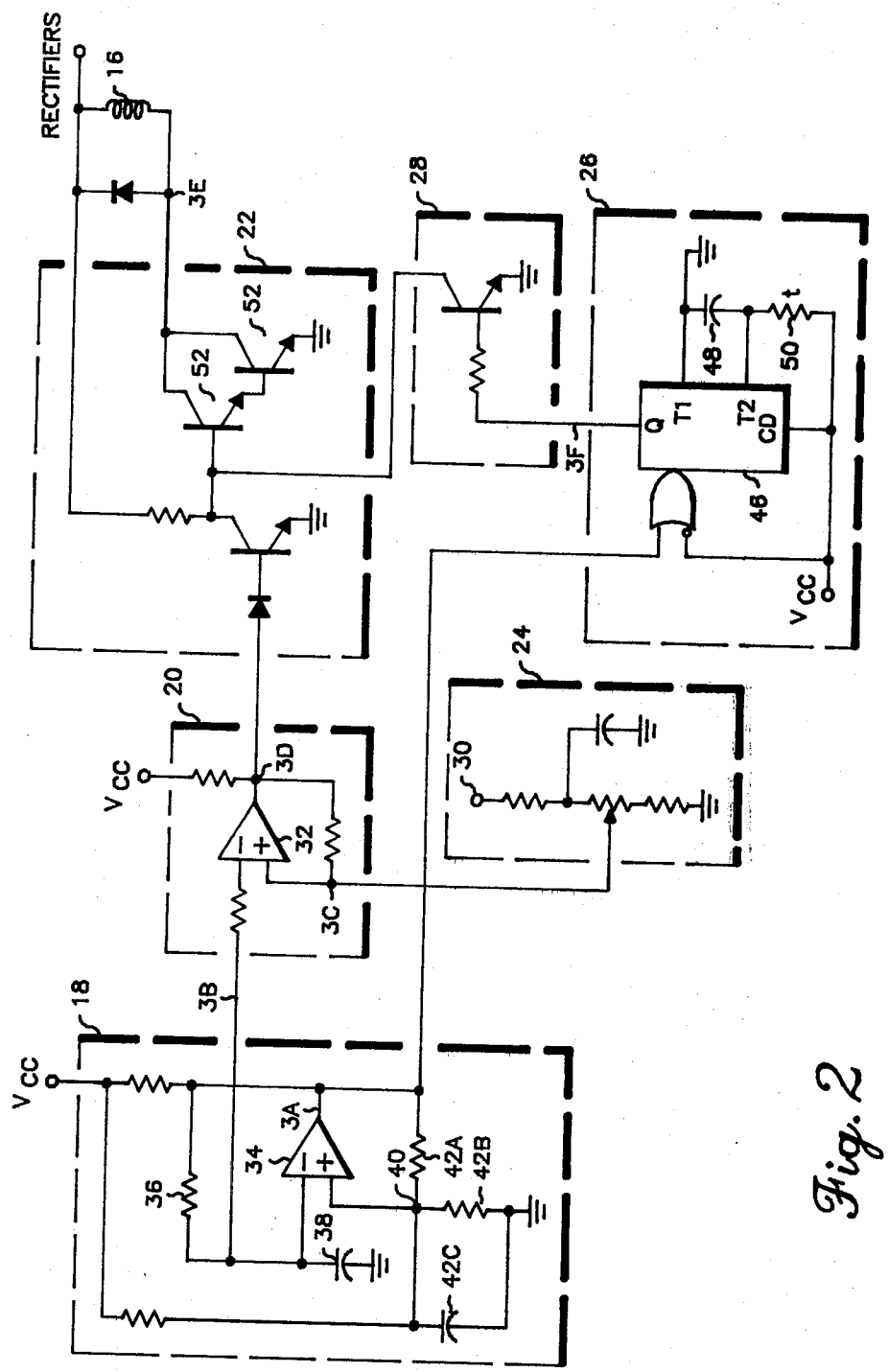
FIG. 2 is a schematic diagram of a portion of FIG. 1.

FIG. 2 is a schematic diagram corresponding to the blocks of FIG. 1, lacking the battery 10, and the windings 12 and rectifiers 14 of the alternator 11. The operation of the circuit will be described in conjunction with FIG. 3.

Figure 3:
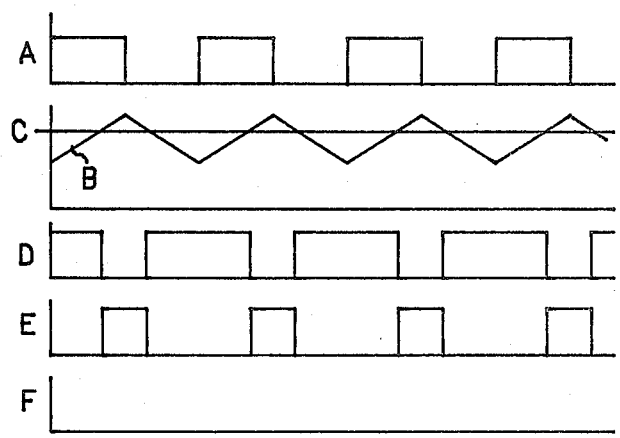
FIG. 3 is a timing chart of the wave forms at significant points in the diagram of FIG. 2 under three different sets of operating conditions.
Figure 3:
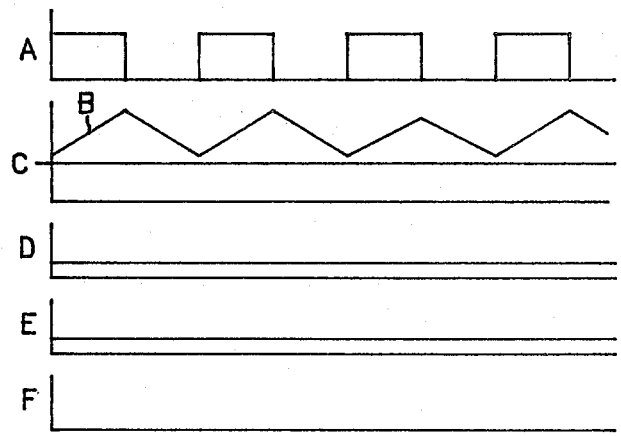
Figure 3:
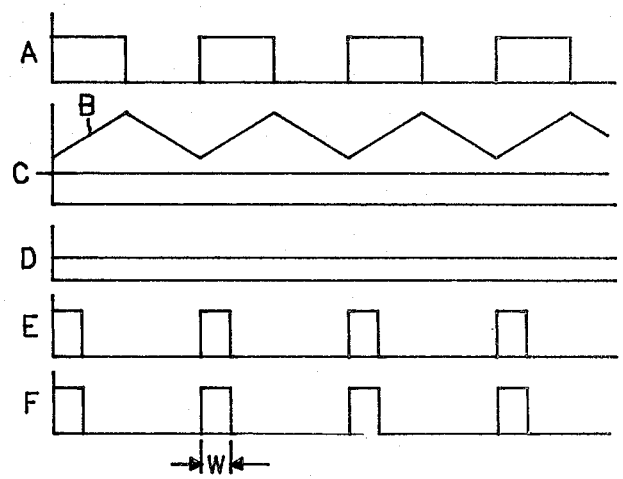

FIG. 3 is a timing chart for the circuit of FIG. 2, under three sets of operating conditions. In 3 I the alternator is running at a normal load level and normal temperature, and there is no temperature limiting present. In 3 II, the alternator output has increased to "full load" but there is still no temperature limiting since the alternator is cold and probably the ambient temperature is low. In 3 III, the alternator is also at full load but the sensed temperature has risen and the output power of the alternator is reduced accordingly.

The operation of the circuit of FIG. 2 will be described here with respect to the chart of FIG. 3. The voltage at the positive terminal 30 of the battery 10 is coupled to the divider 24 and a filtered portion (3C) is coupled as a reference voltage to the positive input of an operational amplifier 32 in the comparator circuit 20. Coupled to the negative input of the amplifier 32 is a triangle wave 3B from the triangle generator 18. The square wave output 3A from an operational amplifier 34 in the generator 18 is coupled back through a resistor 36 to charge a capacitor 38 at the negative input of the op amp 34.

A portion of the op amp output signal 3A is coupled to the positive input 40 of the op amp 34. The input 40 is a tap on a divider circuit including resistors 42a, 42b and capacitor 42c. While the voltage 3B is lower than the voltage at input 40, the capacitor 38 will charge. When the voltage 3B is sufficiently high compared to the voltage on the positive input 40 of the op amp 34, the output 3A will drop and the capacitor 38 will discharge. Thus the voltage across the capacitor 38 is the triangle wave 3B. In the preferred embodiment, the frequency of the wave 3B is around 50 hertz.

When the triangle wave 3B is compared with the battery reference voltage 3C, the output of the op amp 32 is the voltage 3D. If the reference voltage 3C is high, the pulses of voltage 3D will be wide relative to the period of the pulses whereas, if the reference voltage is lower, the pulses of the square wave 3D will be narrower (i.e., 3D will have a shorter duty cycle) and will go to zero at still higher loads. In all cases, the period/frequency does not change. The signal 3D is coupled through the output driver stage 22 to the field coil 16 for controlling the field excitation current.

The output 3F of the monostable 26 is also coupled to the driver stage 22 via the clamping circuit 28. The monostable circuit 26 includes a monostable multivibrator 46 such as the Motorola MC 14528B whose output pulse widths are controlled by an external resistor/capacitor combination. In the present circuit, a capacitor 48 is fixed and the pulse width is determined by the variable resistance of a thermistor 50. The circuit is triggered by the leading edge of the pulses 3A, at a constant frequency. The capacitor/resistor values for this application are chosen so that, at normal temperatures, the width of the pulses of signal 3F are negligible. (In 3 I and 3 II, signal 3F is indicated as a straight line or zero percent duty cycle signal.) Signal 3F, therefore, has no effect on the output driver 22 under the normal load/normal temperature conditions of 3 I.

As seen in 3 II, the alternator 11 is operating under full load/normal temperature conditions. Signal 3A is essentially the same square wave as in 3 I, and 3B is essentially the same triangle wave as before. Signal 3C the reference voltage determined by the sensed battery voltage is now lower than 3B. Signal 3D, the output of the comparator circuit 20 is no longer the square wave of 3 I but is at a constant level or nearly so. he output 3E of the driver 22 will thus be at or near a constant level since the monostable 26 output 3F is still at or near a zero pulse width. The field coil will, therefore, receive maximum excitation current by means of the driver circuit 22.

As shown in 3 III, the temperature of the alternator 11 has increased due, perhaps, to an increase to ambient temperature or merely to heavy and substained loading on the alternator. In any event, the maximum allowable load current must be reduced. The resistance of the thermistor 34 has now changed, increasing the duty cycle 3F at the multivibrator 46 output. When the pulses of 3F are coupled to the clamping circuit 28, a transistor in a Darlington pair 52 in the driver 22 is controlled, not only by signal 3D but by 3F which here overrides 3D. The narrow pulses (w) of 3F as shown in 3 III reduce the field coil excitation, and if the temperature rises further, the pulses of 3F broaden accordingly, thus reducing the excitation current to a safe level and reducing the temperature sensed by the thermistor 34.

It has been shown, therefore, that an alternator operating in accordance with the present invention will be voltage regulated in accordance with the battery voltage but will, in addition, have its maximum allowable load determined by a sensed temperature which is a function of alternator operation and ambient temperatures. Thus, when the alternator is not in danger of overheating, as on starting a vehicle or in very cold weather, a higher maximum load is permitted than is the case under normal running conditions. These conditions are, of course, the very conditions under which a higher load capability is most needed. As is also highly desirable, this variable load control is obtained with very little added power dissipation. Power is thereby con-served and the overheated condition is not worsened by the control circuit itself.

Other variations and modifications of the above-described circuit are possible and it is intended to cover all such as fall within the spirit and scope of the appended claims.

What is claimed is:

1. A temperature limited voltage regulator circuit for an alternator/battery combination and comprising:
   coil means for providing a magnetic field in the alternator;
   driver means coupled to the coil means for supplying current thereto;
   a voltage sensing circuit for sensing an output voltage of the alternator and for providing a first control pulse signal to the driver means in response to the sensed voltage; and
   a temperature sensing circuit for sensing a temperature related to the alternator and for providing a second control pulse signal to the driver means in response to the sensed temperature, and wherein the current supplied by the driver means to the coil means is a function of the widths of the pulses in the first and second control pulse signals.

2. A temperature limited voltage regulator circuit for an alternator/battery combination in accordance with claim 1, and wherein the driver means includes a pair of transistors coupled as a Darlington pair and a third transistor coupled to control the transistor pair, and wherein the temperature sensing circuit includes a transistor for supplying the second control pulse to control the transistor pair in the driver means.

3. A temperature limited voltage regulator circuit for an alternator/battery combination in accordance with claim 1, and wherein the temperature sensing circuit includes a temperature sensing device positioned adjacent a portion of the alternator.

4. A temperature limited voltage regulator circuit for an alternator/battery combination in accordance with claim 3, and wherein the temperature sensing circuit includes a monostable multivibrator and a resistor/capacitor combination coupled to control the width of the output pulses of the multivibrator, and the resistor of the combination is the temperature sensing device.

5. A temperature limited voltage regulator circuit for an alternator/battery combination in accordance with claim 4, and wherein the resistor of the combination is a thermistor.

6. A temperature limited voltage regulator circuit for an alternator/battery combination in accordance with claim 4, and wherein the voltage sensing circuit includes a wave generator for providing a triangle wave output signal and a square wave output signal and the square wave signal is a trigger input signal for the monostable multivibrator.

* * * * *